June 13, 1961 A. FRÖHLICH 2,987,769
APPARATUS FOR VULCANIZING PNEUMATIC TIRES
Filed Sept. 9, 1954 6 Sheets-Sheet 3
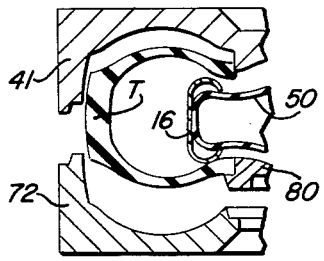
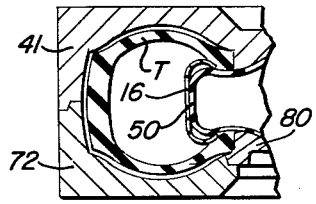
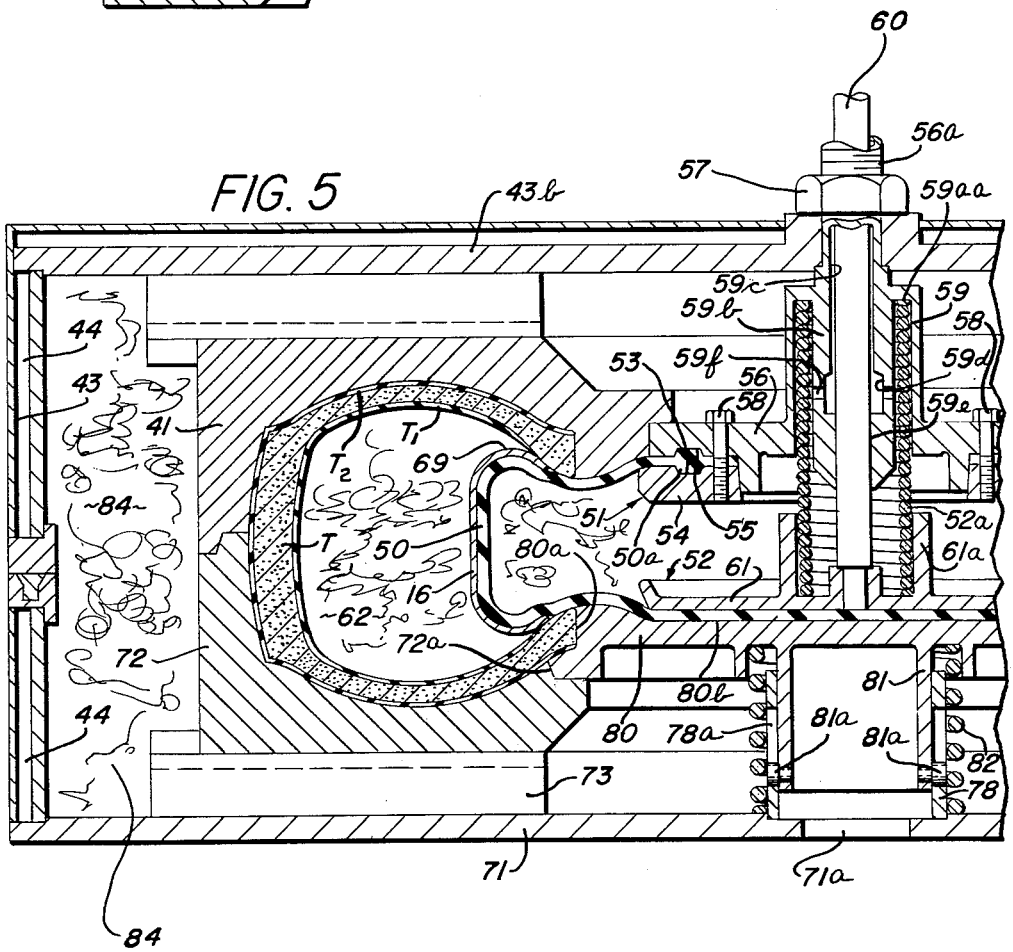
INVENTOR.
ADOLF FROHLICH
BY J. William Freeman
ATTORNEY June 13, 1961  A. FRÖHLICH  2,987,769
APPARATUS FOR VULCANIZING PNEUMATIC TIRES
Filed Sept. 9, 1954  6 Sheets-Sheet 4
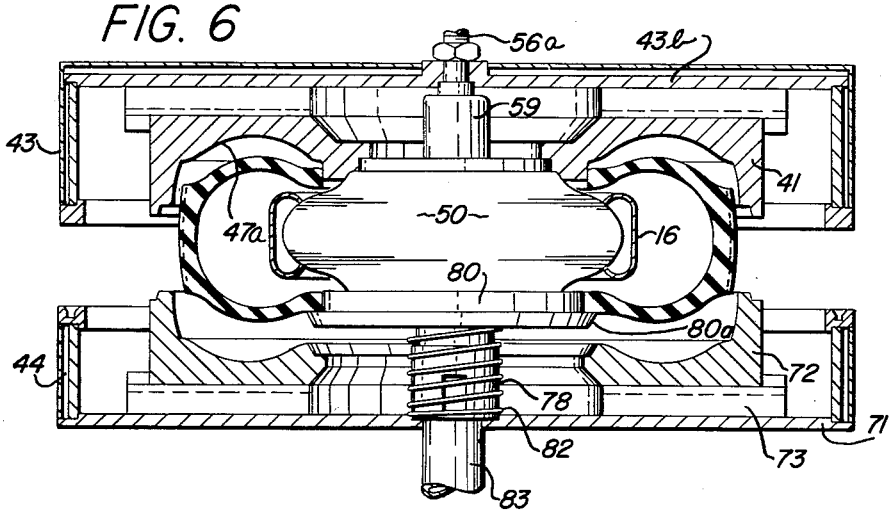
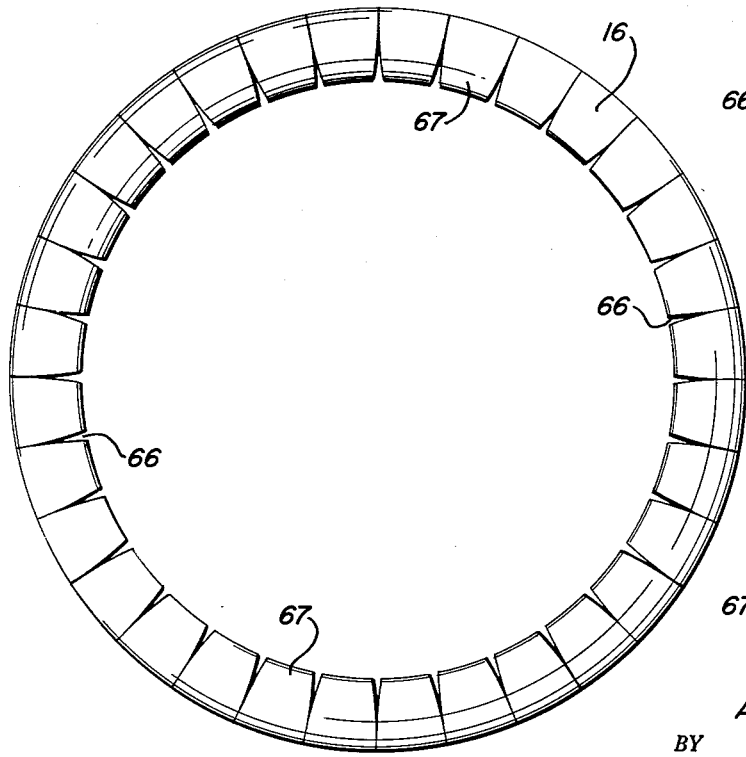
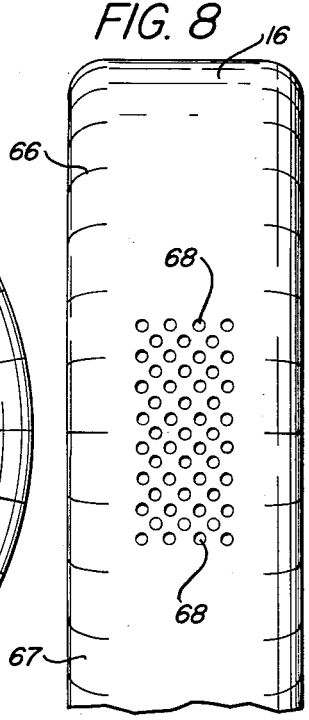
INVENTOR.
ADOLF FRÖHLICH
BY
F. William Freeman
ATTORNEY INVENTOR.
ADOLF FRÖHLICH
BY J. William Freeman
ATTORNEY

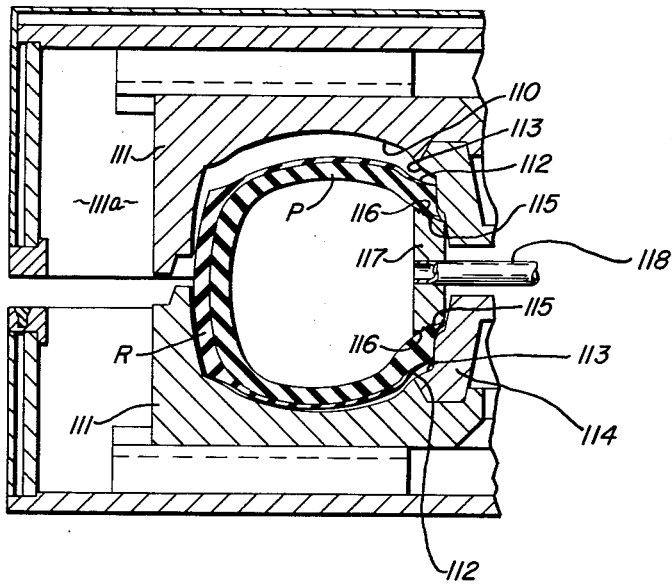
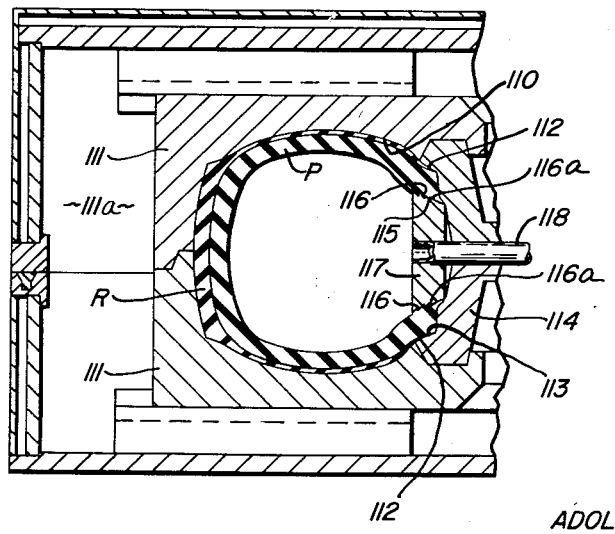

ated June 13, 1961

2,987,769
APPARATUS FOR VULCANIZING PNEUMATIC TIRES

Adolf Fröhlich, Hanover, Germany, assignor to The Cleveland Trust Company, Cleveland, Ohio, as trustee
Filed Sept. 9, 1954, Ser. No. 454,910
16 Claims. (Cl. 18—17)

This invention relates to the vulcanization of pneumatic tires and in particular relates to improved methods and apparatus for effectuating such vulcanization.

For several years past, pneumatic tires have been vulcanized by subjecting the uncured tire to the action of a vulcanizing medium such as steam, hot air, or hot water. This operation is normally carried out by positioning the uncured tire between complemental mold cavities of a vulcanizing press that is provided with an annular chamber, that, in effect, surrounds the uncured tire when the mold sections are closed. Curing or vulcanizing, of the thus-positioned tire is then accomplished by supplying a vulcanizing medium internally of the chamber so that the heat thereof can be transmitted through the cavity walls to initially cure the external surface of the tire that is in immediate contact with the mold sections. As the process of vulcanization continues, this curing effect will progress inwardly of the tire until such time as the interior wall of the tire is vulcanized, at which time the vulcanizing process may be considered completed.

Because the successful operation of the aforementioned vulcanizing process is predicated upon the presence of a complete and firm contact between the complemental mold cavities and the external surface of the uncured tire carcass, it is manifest that certain provisions must be made to assure complete registry of the uncured tire with respect to the aforementioned mold sections.

In the known prior art, the attainment of this desired registry between the mold cavities and the external surface of the uncured tire has been accomplished by the use of a pneumatic former that is applied interiorly of the uncured tire and is then inflated to urge the uncured tire outwardly into the desired registry with the complemental mold sections.

The above use of pneumatic formers was, in general, dictated by certain inherent characteristics of the uncured tire. Specifically, it was found that the uncured tire fabric could not be subjected to a direct application of fluid pressure in view of the fact that such pressure application resulted in the dislocation of the cords with respect to the uncured tire. This dislocation often resulted in complete dislodging of the cords with respect to the rubber compound, with the result that the cords of the finished tire would often be freely projecting from the finished tire. In this protruding position the cords were incapable of functioning properly as a component element of a pneumatic tire, and consequently the tire was necessarily rejected. Additionally, the somewhat porous nature of the rubber compound resulted in the formation of undesirable air pockets interiorly of the tire casing. These air pockets expand greatly during vulcanization period with the result that further separation of the cord plies occurs.

The earlier forms of prior art devices that were utilized to effectuate this desired condition of registry comprised an inflatable annulus that was conventionally known throughout the trade as an "air-bag." This "air-bag" was positioned interiorly of the uncured tire and was then inflated to effectuate the requisite expansion of the uncured tire. Generally speaking, the "air-bag" was made of fluid-impervious material with the result that a pressurized fluid could be employed interiorly thereof to create the necessary expansion. The positioning and repositioning of the "air-bag" was initially done by manual operation, but later refinements in the tire-vulcanizing field have provided devices that have included this inflatable former as a constituent element thereof, and in these improved forms of vulcanizing presses, the expandable pneumatic former was carried by one of the relatively movable mold sections of the vulcanizing press, and the positioning and subsequent removal thereof was automatically controlled by the relative movement of the mold sections during the opening and closing of the vulcanizing press.

It will be seen from the foregoing discussion of the known prior art that all currently known methods of tire vulcanization include the use of a pneumatic former that is positioned interiorly of the uncured tire, so as to expand the same into registry with the mold sections upon the inflation of the pneumatic former.

It has been discovered that the vulcanization of pneumatic tires can be carried out without the use of an inflatable former to expand the uncured tire into registry with the mold sections. In substance, the invention amounts to the discovery that certain portions of the uncured tire can be treated to change the inherent characteristics thereof and thereby render the same usable to accomplish the function normally obtained by the use of the inflatable former.

This aforementioned change in the inherent physical characteristics of a localized area of an uncured tire permits the direct application, interiorly, of pressurized fluid against the internal wall of the tire per se, with the result that the same is urged outwardly as an integrally provided "air-bag," to thus urge the uncured tire into complete registry of the complemental mold sections.

Accordingly, it is one object of this invention to provide an improved method of vulcanization wherein the inherent characteristics of certain portions of the uncured tire to be vulcanized are changed.

It is a still further object of this invention to provide a method of vulcanizing pneumatic tires wherein two separate vulcanizing operations are employed.

It is a still further object of this invention to provide a method of vulcanizing pneumatic tires wherein a pressurized fluid can be applied directly against the internal wall of the uncured tire, to cause expansion of the same into registry with the cavity surfaces.

It is a still further object of this invention to provide a method of vulcanizing pneumatic tires wherein the conventional use of an "air-bag" to expand the uncured tire is eliminated.

It is a still further object of this invention to provide a method of vulcanizing pneumatic tires wherein the overall vulcanization process includes a preliminary vulcanization of the internal wall of the uncured tire.

It is a still further object of this invention to provide vulcanizing apparatus capable of performing the above objects.

It is a still further object of this invention to provide a vulcanizing press having a plurality of vulcanizing chambers disposed externally and internally of the uncured tire positioned therein.

It is a still further object of this invention to provide a vulcanizing press that is devoid of a pneumatic former that engages the internal wall of a tire positioned therein.

It is a still further object of this invention to provide a method of replacing worn tread and sidewall portions of a used pneumatic tire wherein the use of a pneumatic former is obviated.

It is a still further object of this invention to provide a vulcanizing chamber that is defined by the positioned uncured tire and a component element of the vulcanizing press, which chamber is further characterized by being presented interiorly of the uncured tire.

It has been discovered that the aforementioned objects can be obtained by the use of a preliminary vulcanization that occurs interiorly of the positioned uncured tire prior to the usual vulcanization, which subsequently occurs in the surrounding chamber of the known vulcanizing presses. The effect of this vulcanization is to cure a predetermined depth of the internal wall of the uncured tire, with the result that the physical condition thereof is substantially changed. This physical change is especially apparent with respect to the positioning of the cords within the rubber compound of the tire fabric. When this pre-determined depth of the internal wall has been cured, as will be described, the cords will remain subsequently in the same position with respect to the surrounding rubber compound, even though the tire fabric is subjected to a certain degree of expansion during the application of the internal pressure required to expand the tire carcass into registry with the cavity mold. In addition, after vulcanization, the internal wall or skin of the tire carcass is impervious to the passage of pressurized fluid therethrough, with the net result that this cured skin portion can serve as an integrally provided air-bag capable of functioning in a manner similar to the prior art pneumatic former.

In practice, the above-described novel method of vulcanization is carried out by use of a flexible or resilient bladder that is removably positioned between the bead portions of the uncured tire to create an annular chamber that is defined by the said bladder and the internal wall of the uncured tire. The thus-created chamber may be sealed at the circumferential points of contact between the bladder and the uncured tire by expansion of the resilient bladder, although it is manifest that an equivalent seal could be obtained by the urging of the uncured tire into sealing engagement with a relatively inflexible annulus or bladder.

The sealed chamber just described is then filled with a vulcanizing medium, such as superheated steam, at a relatively low pressure, at which time the curing of the "skin" portion of the internal wall may be effectuated in a relatively short time. This time period is determined primarily by the temperature of the vulcanizing medium and it follows that the time period for ordinary steam would be greater than the period required when "superheated" steam was employed. When sufficient time has elapsed to permit vulcanization of the "skin" portion of the uncured tire, the pressure in the sealed chamber is increased, with the result that the cured "skin" is expanded outwardly as an "air-bag." This outward expansion operates to simultaneously urge the exterior surface of the uncured tire outwardly into complete registry with the cavity surfaces of the mold sections, at which time the usual vulcanizing cycle may be commenced.

In the ensuing paragraphs, there are described certain devices and apparatuses capable of carrying out the novel methods of vulcanization above set forth. Accordingly, a more complete understanding of the invention may be obtained by a reading of the following brief specification, considered and interpreted in the light of the accompanying drawings.

Of the drawings:

FIGURE 3 is a sectional view illustrating the position of the component parts just prior to closing of the mold section.

FIGURE 4 is a sectional view illustrating the press in closed condition just prior to the introduction of the vulcanizing medium interiorly of the uncured tire.

FIGURE 5 is a sectional view illustrating the position and condition of the component parts after the completion of the preliminary vulcanization and shortly after the start of the main vulcanization cycle.

FIGURE 6 is a sectional view illustrating the removal of the cured tire after completion of the vulcanization period.

FIGURE 7 is a plan view of the annular ring that cooperates with other component elements to effectuate the novel vulcanization.

FIGURE 8 is a side elevation taken on the lines 8—8 of FIGURE 7.

FIGURES 11 and 12 are sectional views of a modified form of the invention.

Figure 1:
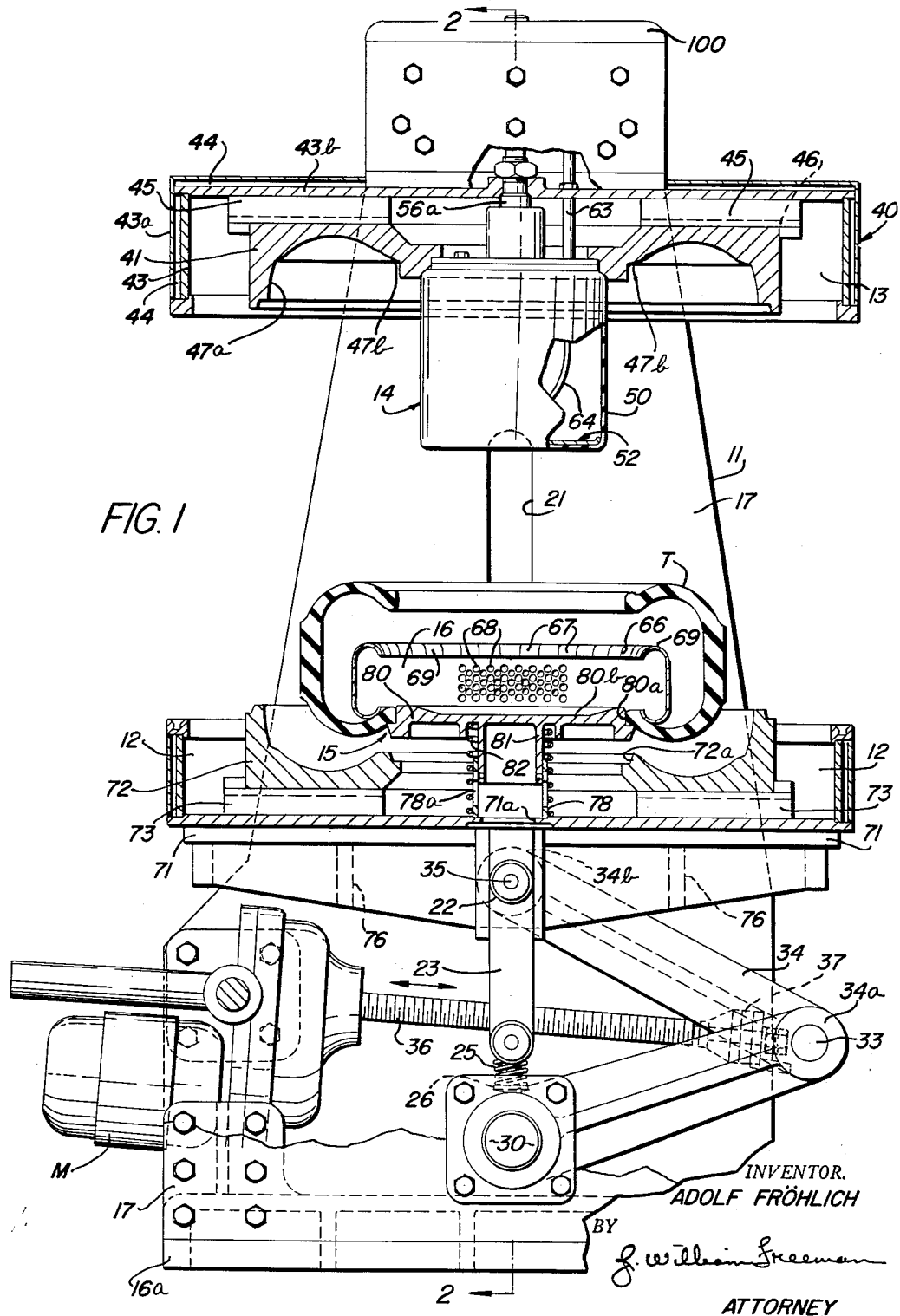
FIGURE 1 is a side elevation, partly broken away and in section, and illustrating the vulcanizing press in "open" position as at the start of a vulcanizing cycle.
Figure 2:
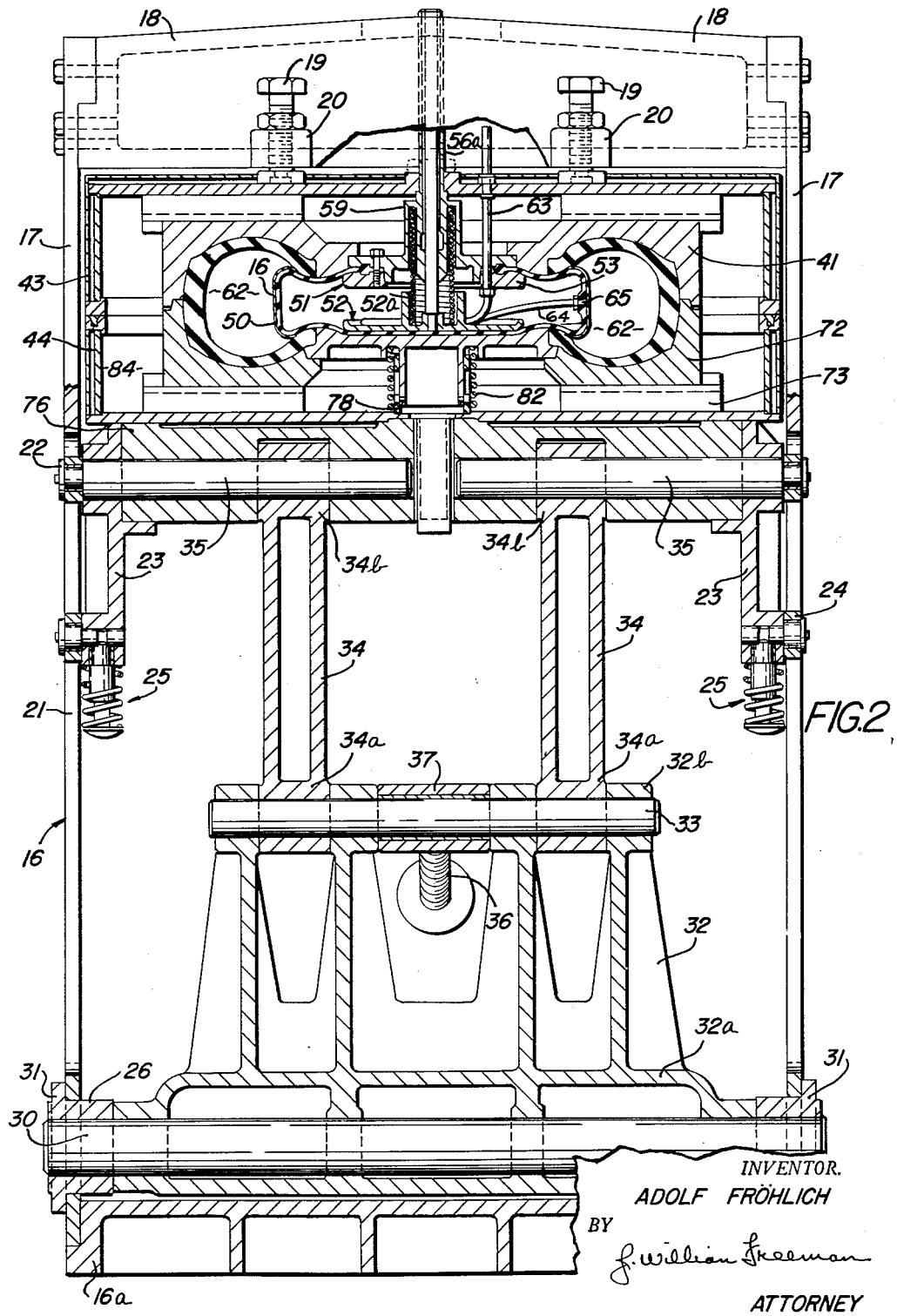
FIGURE 2 is a view taken on the lines 2—2 of FIGURE 1 but showing the press in closed position.

Referring now to FIGURES 1 to 8 of the drawings and in particular, to FIGURES 1 and 2 thereof, the improved vulcanizing press, generally designated as 10, is shown as including a housing 11, that supports a vertically movable lower mold section 12 and a complemetary, stationary, upper mold section 13. The means for effectuating the novel preliminary vulcanization interiorly of the tire are indicated in FIGURE 1 as being of two-piece construction and generally include an expandable bladder mechanism 14, carried by the upper mold section 13 and being cooperatively engaged by an annular ring 16 that is positioned in and carried by the uncured tire T. This uncured tire T, is, in turn, supported upon a bead ejector mechanism 15 of the lower mold section 12. In order that the construction of the vulcanizing apparatus might be more fully understood, especially as relates to the manner in which the same effectuates the novel preliminary vulcanization interiorly of the uncured tire, the component parts thereof will be separately described.

Description of housing

The preferred form of housing 11, that is illustrated in conjunction with the improved vulcanizing press, is shown as including a rectangular base member 16a that has the opposed edge portions thereof secured to the upright side frame members 17, 17, that are in turn, interconnected at their free ends by a structural plate member 18. (See FIGURE 2.) The upper mold section 13 is shown carried by the structural plate member 18 in known manner as by bolts 19, 19 secured to the plate 18 through lug members 20, 20. For the purpose of receiving the lower mold section 12 in vertically movable relationship, the upright members 17, 17 are shown provided with vertically extending slots 21, 21 that receive rollers 22, 22 that are provided on the opposed edges of the lower mold section 12.

To the end of maintaining the lower mold section 12 in a condition of parallelism with respect to the upper mold section 13, vertically depending integral arms 23, 23 are provided and have their lower extremity equipped with rollers 24, 24 that are received within the slots 21, 21 at a point below the rollers 22, 22. The lower extremity of the arms 23, 23 are also provided with a bumper mechanism 25 that is engageable with an appropriate abutment 26, upon the lowering of the lower section 12 to the "open" position.

Press actuating mechanism

The mechanism that is employed to vertically move the lower mold section 12 into registry with the upper mold section 13 for the purpose of effectuating vulcanization, may be generally described as a power-operated elbow linkage, and is best illustrated in FIGURE 1 of the drawings.

Accordingly, in this form of linkage, there is provided a stationary shaft 30 that extends transversely of the base 16a to be received in bearings 31, 31 of the uprights 17, 17. Received about the shaft 30 in relatively rotational relationship therewith, is the eyelet end 32a of a link member 32 that has the opposed eyelet end 32b thereof similarly received about a shaft 33. Also received about the shaft 33 in relatively rotational relationship therewith, are the eyelet ends 34a, 34a of a tandem linkage 34 that has the opposite eyelet ends 34b, 34b thereof rotationally received about axially aligned shafts 35, 35 that extend transversely of the bed plate 71 of the lower mold section 12.

Actuation of this just-described elbow linkage is facilitated through the medium of a screw shaft 36 that is connected to the shaft 33 through a knuckle joint 37. This screw shaft 36 is moved by a gear box 38 that is, in turn, driven by a motor M. The arrangement of this driving mechanism is such that counter-clockwise movement of the gear box unit 38 will result in axial movement of shaft 36 to the left of FIGURE 1. This axial movement is transmitted to the shaft 33 through the knuckle joint 37, with the result that the shaft 33 is moved along the axis of the screw shaft 36. Reversal of the motor M results in reversal of this axial movement. It is manifest that other means, such as a hydraulically actuated piston, could be employed to operate the elbow linkage just described.

The upper mold section

The upper mold section, which has generally been designated as 13, includes in essence, a chamber 40 that supports a cavity mold 41 and the expandable bladder mechanism 14, the latter being indirectly secured to the chamber 40. Additionally, the chamber 40 also serves as a source of supply for air, steam, or hot water that is provided interiorly of the bladder mechanism 14.

As is best shown in FIGURES 1, 2 and 5 of the drawings, the chamber 40 is illustrated as being of "double wall" construction whereby a series of inner structural side and top plates 43, 43 are spaced with respect to corresponding cover plates 43a, 43a to define a series of air spaces 44, 44 that act as insulation barriers during the vulcanization process. Secured to the top inner plate, which has been designated as 43b for the sake of clarity, are a plurality of rectangular blocks 45, 45, each of which is provided with the usual T slot 46 for reception therein of the heads of bolts 46a that are secured to flanges 41a of the cavity mold 40 in known manner. It is manifest that by the use of the T slots 46, provision is made for reception of cavity molds of varying radial dimension in the same chamber 40.

The cavity mold 41 is of conventional shape except for certain configurations necessary to properly seat the upper end portion of the bladder mechanism 14. Accordingly, the cavity surface 47 includes the usual contoured surface 47a for imparting exterior design to the tire T as well as bead seats 47b, 47b for reception of the tire beads and bladder mechanism, respectively.

The lower mold section

In view of the complementary nature of upper and lower mold sections 13 and 12, respectively, a detailed description of the complemental parts of the lower mold section 12 will not be undertaken at this point. It suffices to say that a complementary chamber 70, of "double wall" construction, is supported on the bed plate 71, and in turn, supports a complemental cavity mold 72 through blocks 73, 73 having T slots 74, 74. These slots receive the heads of the usual bolts 75, 75 that are secured with respect to the cavity mold 72, as before described. As is best shown in FIGURE 2, the bed plate 71 is supported on structural cross members 76, 76, and is provided with the journaled shafts 35, 35 that cooperate with the previously described elbow linkage to effectuate raising of the lower mold section as described.

The construction of the cavity mold 72 departs from being complemental to that of the cavity mold 41 with regard to the provision therein of a central aperture 72, that includes an annular seat 72a for engagement with the bead ejector mechanism 15 in a manner to be described. To this end, the bead ejector mechanism 15 includes a circular disc 80, having a bead seat 80a that receives the bead portions of the uncured tire T in the manner illustrated in FIGURE 1. The upper surface of the disc 80 is shown as being slightly concaved to define a seat 80b that releasably supports the collapsed bladder mechanism in the position of FIGURE 2. For the purpose of spacing the disc 80 with respect to the mold 72, the same (disc 80) is shown provided with a depending tubular extension 81 that is located centrally of the disc 80 and is telescopically received by a complemental tubular extension 78 of the bed plate 71. The disc 80 is normally urged into spaced relationship with the mold 72 by a spring 82, while a stop 81a serves to limit the amount of relative outward movement between the members 81 and 78. (See FIGURE 5.)

The bed plate member 71 also includes a central opening 71a, that communicates with a surrounding vulcanizing chamber 84 through port openings 78a, 78a in the tubular member 78, the arrangement being such that the vulcanizing medium is supplied to opening 71a through conduit 83 for entrance into chamber 84. Drainage of the chamber 84 may be facilitated by providing a slight draft of approximately 3° on the inner surface of the bed plate 71, whereby condensation or other fluid products of the vulcanizing medium may be directed towards the central opening 71a.

The internal vulcanizing means

As has been previously indicated, the internal vulcanizing means includes an expandable bladder mechanism 14 that is carried by the upper mold section 13 in such a manner as to be cooperatively engaged by an annular ring 16 upon relative movement of the mold sections to the position of FIGURE 2. Such engagement of component parts permits control of the amount of radial expansion occurring in the bladder mechanism during the preliminary vulcanization.

As is best shown in FIGURES 2 and 5, the bladder mechanism 14 includes a tubular bladder 50 of resilient, fluid-impervious material, that is supported at the opposed axial ends thereof by upper and lower end members 51, 52, respectively, the arrangement being such that the end members 51 and 52 are continually urged about to the position of FIGURE 1 by the coil spring 52a.

The upper end member 51 is shown as being of two-piece construction wherein a circular groove 53, provided on one face of an annular ring 54, cooperates with a complemental groove 55 on the face of an annular casting 56, so as to grip the bead edge 50a of the bladder 50 and thus support the same with respect to the upper mold section 13. This last-mentioned support is accomplished by securing a threaded extension 56a of the casting 56 in seated relationship to the top inner plate 43b by a nut 57 in known manner. The ring 54 and casting 56 are illustrated as being retained in gripping engagement about the bead 50a by bolts 58 that operate as clamping devices for this purpose.

For the purpose of seating one end of the coil spring 52a the casting 56 includes a tubular extension 59 that has the end wall 59a thereof returned to define a concentric inner tubular member 59b. To provide a point of supply for fluid that will be introduced interiorly of the bladder 50, the inner wall of the tubular member 59b is shown defined by a plurality of walls 59c, 59d, 59e, each of which is of different diameter. Additionally the wall 59d is provided with port openings 59f, 59f that communicate the interior of tubular member 59b with the interior of the bladder 50, the arrangement being such that the fluid entering the casting 56, adjacent the threaded extension 56a thereof, can flow in the space between the wall 59c and a shaft 60 to pass through port openings 59f, 59f, into the interior of the bladder 50. The wall 59e is of approximately the same diameter as the shaft 60 with the result that the same serves as a thrust bearing to prevent side thrust of the shaft 60 during such periods as relative movement occurs between the casting 56 and the shaft 60.

The lower end member 52 is defined by a disc member 61 that has a tubular boss 61a provided centrally thereof for reception of the spring 52a and shaft 60, the latter being fixedly secured to disc 61 so as to move therewith during the closing of the press.

Because the entrance of pressurized fluid interiorly of the bladder 50 operates to expand the same into contact with the inner bead portions of the uncured tire, as shown in FIGURE 2, it is manifest that a sealed chamber, generally indicated as 62, is created by the expanded bladder 50 and the internal wall of the uncured tire. It is within this chamber 62 that the previously mentioned, preliminary vulcanization occurs, and, accordingly, the bladder mechanism 14 is shown adapted to perform the function of supplying the requisite vulcanizing medium to the interior of the chamber 62. To this end, a supply line 63 connects with a flexible conduit 64 that in turn, communicates with the chamber 62 through an opening 65 in the wall of the bladder 50. In this manner, vulcanizing and/or pressurized fluid mediums may conveniently be introduced to the chamber 62 from supply line 63, it being understood that the supply line 63 constitutes a source for either or both the vulcanizing medium and pressurized fluid.

While it is manifest that the bladder 50 must be expanded outwardly into contact with the inner bead portions of the uncured tire in order to properly seal the chamber 62 that is defined thereby, it is equally important that the expansion of the resilient bladder 50 must also be limited to prevent the same from engaging further portions of the internal wall of the uncured tire. Such engagement would, in effect, eliminate the chamber 62, and would accordingly eliminate the possibility of effectuating the novel preliminary vulcanization that takes place therein, and the bladders 50 would possibly burst or at least, its durability would be impaired. Thus, to obviate this possibility the internal vulcanizing means includes a non-expansible, annular ring 16 that is capable of being positioned between the beads of the uncured tire to restrict the radially outward movement of the bladder 50 to the extreme position illustrated in FIGURE 2. Because the ring 16 is positioned within the uncured tire prior to vulcanization (see FIGURE 2), the edge portions thereof are slotted as at 66, 66 to define a series of adjacent tabs 67, 67. This structure results in extreme flexibility of the ring 16, thus permitting the same to be easily positioned and subsequently removed from the tire. By like token, a localized area (see FIGURE 8) of the ring 16 is apertured as at 68, 68 to permit the passage of fluid from opening 65 to chamber 62. Additionally, the edge portions 69, 69 of the ring 16 are shown inturned to further restrict the area of sealed contact between the bladder 50 and tire T.

*Operation of the vulcanizing press*

In use or operation of the improved vulcanizing press 10, the upper and lower mold sections 13 and 12, respectively, are positioned in the separated condition shown in FIGURE 1 of the drawings. In this position the bead ejector mechanism 15 is spaced with respect to the cavity mold 72, by virtue of the force exerted by the coil spring 82. Accordingly, with the disc 80 of the bead ejector mechanism 15 thus spaced, an uncured tire may be positioned on the bead seat 80a thereof for subsequent vulcanization in a manner to be described. A further preliminary preparation for vulcanization is made by the insertion of the annular ring 16 interiorly of the uncured tire, as is best shown in FIGURE 1, it being understood that the same may be easily positioned within the uncured tire by virtue of the inherent flexibility of the ring that results from the provision of the tabs 67, 67.

With the unformed tire and ring 16 thus positioned, the motor M may be started, thus initiating movement of the screw shaft 36 through the medium of gear box 38. As has been previously described, the counter-clockwise rotational movement of the gear box 38 will operate to move the shaft 36 to the left of FIGURE 1 with the result that the shaft 33 will also be urged to the left, by virtue of its connection with the screw shaft 36 through knuckle joint 37. As this movement to the left of the shaft 36 continues, the arm 32 will pivot about the shafts 30 and 33, while the tandem link 34 will similarly pivot about shafts 33 and 35 (see FIGURE 2). In this manner, shafts 35, 35 will be separated with respect to shaft 30, and this separation is translated into vertical shifting of the lower mold section 12 by the use of rollers 22, 22. During the period that the lower mold section 12 is being raised, it is manifest that the same will be maintained in parallel relationship with respect to the upper mold secton 13, due to the provision of auxiliary rollers 24 that are also received within the slots 21, 21 at a point below the rollers 22, 22.

As this upward movement of the lower mold section 12 continues, the seat 80b of the bead ejector mechanism 15 will engage the lower portion of the bladder 50 as the same is defined by end wall 52. Further movement beyond this point of initial engagement will result in axial displacement of the lower end member 52 against the force of the spring 52a, with the result that the bladder mechanism 14 will be collapsed so as to expand a central portion of the bladder radially outwardly towards the position of FIGURE 2. Shortly after this period of collapsing begins, the uncured tire T will strike the bead seat 47b of the upper mold section 13, with the result that the tire will begin deformation towards the position of FIGURE 3. Upon closing of the mold sections 12 and 13, the collapsed bladder 50 and the deformed tire T will assume substantially the position illustrated in FIGURE 4 wherein the annular ring 16 is substantially in contact with the internal bead surfaces of the uncured tire, while the external surfaces of the said tire are slightly spaced with respect to the cavity surfaces of the upper and lower cavity molds 41 and 72.

At this point, expansion of the bladder mechanism 14 may be commenced by supplying pressurized fluid interiorly of the bladder 50 through the port openings 59f, 59f, as has been previously described.

When the bladder 50 has been expanded to a predetermined pressure, it is manifest that portions of the exterior wall thereof will be in circumferential contact with adjacent circumferential portions of the internal beads of the uncured tire. This circumferential contact will result in the formation of an "air-tight" chamber 62 that is defined by the expanded bladder 50 and the uncured tire T. When this chamber 62 has been established as just described, a vulcanizing medium such as steam, superheated steam, hot air or hot water may be introduced interiorly thereof by supplying said vulcanizing medium from supply line 63, it being understood that entrance into this chamber 62 is permitted by the conduit 64 and opening 65 that have been previously described. As the vulcanizing medium enters the chamber 62, under a relatively low pressure, the same will immediately begin the vulcanization of any uncured rubber that is exposed to the presence of the vulcanizing medium. In the vulcanizing chamber 62, this uncured rubber is defined by the internal wall of the tire T, and accordingly, the vulcanization of this internal wall will commence upon the introduction of vulcanizing medium interiorly of the tire.

After sufficient time has elapsed to permit the internal wall to be cured or vulcanized to a pre-determined depth, which is normally somewhat less but which may approximate the thickness of the usual air-bag, entrance of the vulcanizing medium interiorly of the chamber 62 is stopped, and at this time, the supply line 63 is adjusted so that the same will provide a source of pressurized fluid that will be presented interiorly of the chamber 62 through the conduit 64 and opening 65. As the pressurized fluid enters the chamber 62, the same will be directed against a cured internal wall or "skin" of the tire T, and this "skin," being impervious to the passage of fluid therethrough as a result of the just-described vulcanization, will be expanded outwardly, with the result that the external surface of the tire T will be urged into complete registry with the cavity surfaces of the respective mold sections, whereby the tread design will be formed as the result of such pressurized expansion.

In this condition, vulcanization in the normal surrounding annular chambers may be commenced by the entrance of vulcanizing fluid through the line 83, in known manner.

Shortly after the commencement of this just-described main period of vulcanization that is effectuated exteriorly of the tire T, the structural characteristics of the tire T will be substantially as illustrated in FIGURE 5 of the drawings, wherein an internal "skin," designated as $T_1$ is vulcanized in addition to that external portion, designated as $T_2$ that has also been vulcanized as a result of the commencement of the main vulcanizing cycle. As the main or exterior vulcanization cycle continues, it is manifest that the depth of the cured surface $T_2$ will increase until the same reaches the cured "skin" $T_1$, at which time the tire will be completely cured.

After the vulcanization period has been completed, the mold sections 12 and 13 may be separated by initiating operation of the motor M in the reverse direction, at which time the screw shaft 36 will move to the right, thus effectuating the lowering of the lower mold section 12. As the distance between the upper and lower mold sections 13 and 12, respectively, increases, it is manifest that upon release of the air pressure interiorly of both the chamber 62 and the bladder 50, the disc 80 will be urged away from its seat 72a by the action of the spring 82, and will thus automatically effectuate a stripping of the cured tire with respect to the cavity mold 72. By like token, stripping of the cured tire with respect to the upper cavity mold 41 is effectuated by the actual displacement of the lower end member 52 by spring 52a, which operates, in effect, to withdraw the bladder 50 from engagement with both the bead portions of the cured tire and the annular ring 16. (See FIGURE 6.) This tendency towards the restoration of the bladder 50 to the cylindrical shape of FIGURE 1, as just described, creates a downward force on the lower bead sections of the cured tire, with the result that the tire T is then automatically stripped from the upper mold 41.

When the cured tire T has been completely stripped with respect to both the upper and lower mold sections 13 and 12, respectively, it is manifest that the same will then, by its own weight, rest upon the disc 80. It is also apparent that the ring 16 will be removed during the stripping of the tire T, with the result that the same may then be easily removed from the interior of the tire T when the same is resting on the bead ejector mechanism 15, as just described.

A new, uncured tire T is then placed on the bead ejector mechanism 15 for repetition of the above-described cycle.

In the foregoing specification, certain specific embodiments of the invention have been set forth in order to make a full and clear disclosure of the invention. It is to be understood that the embodiments employed above have been representative of a wider range of equivalents that could be employed with equally satisfactory results. For example, the uncured tire which has been illustrated in conjunction with FIGURES 1 to 8 of the drawings, has been indicated as being pre-shaped to approximate the configuration of a normal vulcanized pneumatic tire. It is to be specifically understood that the principle and apparatus of this invention could be easily and readily adapted to operation in conjunction with uncured tires of other configurations, such as the "flat-built" or "pulley-band" type of uncured tires that may be built on a "low-shoulder" or other type building drum.

By like token, general reference has been made with respect to the use of the phrase "vulcanizing medium," and it is to be understood that any suitable vulcanizing medium could be employed. As an example of a satisfactory type of vulcanizing medium, it is submitted that superheated steam initially introduced at temperatures ranging from 300° C. to 500° C. could be employed interiorly of the chamber 62 at pressure ranging from 3 to 5 atmospheres, it being understood that while the superheated steam is initially supplied at a relatively high temperature as previously set forth, that the same will quickly assume the normal vulcanizing temperature of approximately 140° C. to 150° C. The curing period necessary to vulcanize the internal "skin" $T_1$ normally falls within the range of 10 seconds to 3 minutes. However, it follows that a somewhat different duration would be obtained by the use of other vulcanizing media, such as steam, hot air, or hot water, which had a lower temperature. In such cases, the period of vulcanization has been found to range upwardly towards a maximum duration of 10 minutes.

It will be seen from the foregoing paragraphs that there has been provided a new and novel method and apparatus for effectuating the vulcanization of pneumatic tires. The underlying principle of the invention is believed to reside in the use of a preliminary vulcanization which occurs interiorly of the uncured tire so as to eliminate the use of the conventional pneumatic former.

Figure 9:
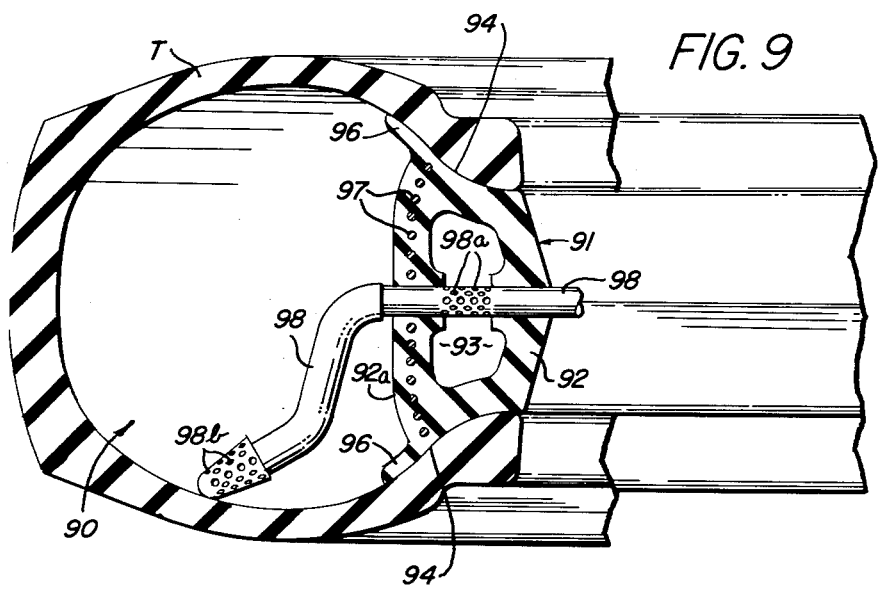
FIGURES 9 and 10 are sectional views of modified forms of the invention.
Figure 10:
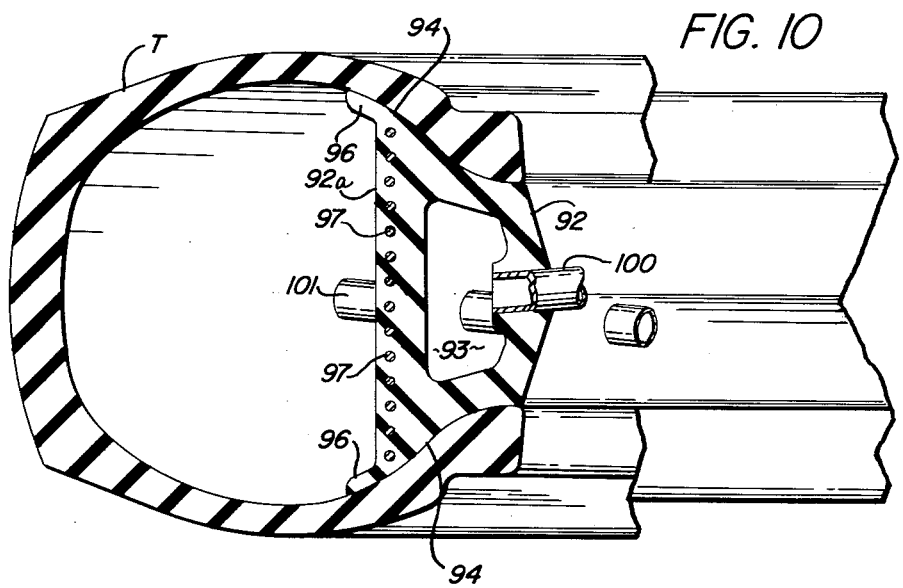

In FIGURES 9 and 10 of the drawings, there are illustrated certain modifications of the invention that generally relate to alternate forms of effectuating an internal chamber within which the preliminary vulcanization occurs. Thus, these modifications relate to alternate types of bladder mechanisms that can be employed in conjunction with the usual vulcanizing press.

Accordingly, the illustration of these modified forms of the invention has been limited to the description of the modified bladder mechanism, it being understood that the vulcanizing press of FIGURES 1 to 8, as well as any other known vulcanizing press, could satisfactorily be employed with these modified bladder mechanisms.

To this end, the modified form of the invention illustrated in FIGURE 9 of the drawings, illustrates the formation of a sealed chammber 90 as a result of the engagement between the internal wall of an uncured tire T and a bladder mechanism that is generally designated as 91. This bladder mechanism comprises a resilient annular core 92 that is provided with an internal annular cavity 93, the arrangement and configuration of which is best illustrated by the sectional view shown in FIGURE 9.

The opposed edge portions of the annular core 92 are contoured as at 94, 94, for reception against the internal bead wall of the uncured tire T, this engagement being aided by the presence of integral flanges 96, 96. For the purpose of limiting the expansion of the core 92, the external wall 92a thereof is shown reinforced by non-extensible wires 97, 97, which may or may not be arranged in coil shape. In this modified form of invention, vulcanizing and/or pressurized fluid is supplied internally of the chambers 90 and 93 through the medium of a common supply line 98 that is provided with apertures as at 98a, 98b, to permit the entrance of the requisite fluid into the respective chambers.

To the end of creating an initially greater internal pressure within the chamber 93, the holes 98a of the conduit 98 are shown as being slightly larger than the holes 98b, with the result that upon entrance of fluid through the conduit 98, the initial pressure in the chamber 93 will be somewhat greater than the initial pressure within the chamber 90. This initial pressure difference permits the annular core 92 to be expanded into sealing contact with the internal bead portions of the tire T prior to the building up of pressure in chamber 90. As the entrance of fluid continues, it is manifest that the pressures in the chambers 93 and 90 will become equalized.

The operation of this modified form of the invention parallels the operation previously set forth above in conjunction with FIGURES 1 to 8 of the drawings, and accordingly, it need only be stated that the pressure of the incoming fluid through the conduit 98 will initially operate to expand the core 92 into engagement with the bead wall of the tire T. The initial fluid supply may, of course, be a vulcanizing medium presented at a representatively low pressure, as above described. As the entrance of this vulcanizing medium continues, the internal wall of the tire T will become cured to a predetermined depth, at which time the fluid in the conduit 98 may be changed to a pressurized medium to urge the uncured tire outwardly and into registry with the mold sections, as above described. During the period of increased pressure, it is manifest that radial expansion of the outer wall 92a of the core 92 will be prevented by the wires 97, 97.

The modified form of the invention illustrated in FIGURE 10 of the drawings, is similar in all respects to the modification of FIGURE 9, with the single exception that a plurality of supply lines are provided to communicate with the respective chambers, as contrasted with the single supply line of FIGURE 9. Accordingly, the chamber 93 is shown being supplied by a conduit 100, while the chamber 90 is supplied by an independent conduit that is designated as 101.

In the use of this modified form of the invention, the cavity 93 of the core 92 is first expanded, by use of a pressurized fluid supplied through conduit 100, to urge the core 92 outwardly into sealing contact with the internal bead wall of the uncured tire. After this sealing contact has been established, the vulcanizing medium may be supplied through the conduit 101 to the interior of the chamber 90, with the result that an internal wall or "skin" thereof will be vulcanized, as has previously been described. Upon completion of the vulcanization, it is manifest that a pressurized fluid may then be supplied through the line 101, to urge the partially cured tire outwardly into the desired registry with the cavity surfaces of the mold sections.

The above modifications have indicated the probability of employing alternate types of bladder mechanisms to accomplish the results and purposes of the invention. By like token, it is manifest that equivalent modifications of other component parts of the specifically described apparatus and methods could be resorted to with equivalent success. For example, the use of any means whatsoever to control the radial expansion of the bladder 50 so that the same was limited to being out of contact with the majority of the interior wall of the uncured tire would fall within the scope of this invention, as would the use of different shaped uncured tires or equivalent curing means, other than the ones above specifically set forth.

Such a modification as is above indicated is found in FIGURES 11 and 12 of the drawings, wherein certain modified apparatus is set forth for effectuating the replacement of worn tread and sidewall portions of a pneumatic tire.

In this type of operation, generally known as "recapping," a new tread and sidewall portion of uncured rubber is vulcanized to the exterior surface of the worn tire after the same has first been stripped of the worn tread and sidewall portions and roughened in the usual manner. The vulcanization required to cause adherence between the new uncured replacement portion and the "skinned" tire is normally carried out in conventional vulcanizing presses that employ a pneumatic former interiorly of the tire for the purpose of expanding the same into registry with the mold cavity. In accordance with the teachings of this invention, it has been discovered that the use of a pneumatic former, such as an "airbag," can be eliminated in recapping operations, if a sealed chamber is formed interiorly of the tire and subsequently provided with pressurized fluid that is operable to expand the same into the desired condition of registry with the mold cavity.

Accordingly, in FIGURE 11 of the drawings, a pneumatic tire, generally designated as P is shown having the "skinned" interior surface thereof provided with a replacement band of uncured rubber R that covers the tread and sidewall portions of the tire P. The re-covered tire just described is additionally shown as being positioned within the cavity surface 110 of the conventional mold section 111, having the usual vulcanizing chamber 111a. (See FIGURE 11.) The exterior bead portions 112, 112 of the re-covered tire are shown received against appropriate seats 113, 113 of an outer bead ring 114 in conventional manner.

For the purpose of creating a sealed chamber interiorly of the tire P when the same is positioned in the mold section 111 as just described, the inner bead surface 115, 115 of the tire P are shown as being engaged by the opposed edges 116, 116 of an annular ring 117, the arrangement being such that the overall width of the ring 117, as defined by edges 116, 116 is slightly greater than the normal spacing between the inner bead portions 115, 115, with the result that the bead portions are slightly moved apart upon insertion of the ring 117 therebetween. As a representative embodiment of the invention, the edge portions 116, 116 may be serrated to define a plurality of ridge portions 116a, 116a that individually engage the internal bead walls 115, 115 of the tire P, and thus create a series of air dams. (See FIGURE 11.) For the purpose of providing air interiorly of the just-described chamber that is defined by the ring 117 and the tire P, the ring 117 is shown having a fluid conduit 118 passing therethrough, so as to supply pressurized fluid interiorly of the just-described chamber. It is manifest that this conduit 118 connects with a convenient source of pressurized fluid.

In use or operation of this modified form of the invention, the band of uncured rubber R is first positioned about the pretreated exterior surface of the tire P in known manner, and with the band R thus positioned, the edges 116, 116 of the ring 117 are engaged against the internal bead walls 115, 115 of the tire P, thus resulting in a moderate separation of these bead edges. In this assembled condition, the tire may then be placed in a cavity of one of the mold sections of a conventional vulcanizing press with the external bead wall being seated upon the bead seat 113 of the outer bead ring 114. (See FIGURE 11.)

In this position the mold sections may be closed, at which time the bead portions will be compressed by virtue of the fact that the distance between the edge portion 116 and the bead seat 113 is less than the normal width of the tire bead. In this compressed condition an air-tight seal will be formed between the internal bead wall 115 and the edge portions 116, 116 of the annular ring 117. With this air-tight seal established, pressurized fluid may be introduced interiorly of the thus created chamber, and this pressurized fluid will operate to urge the tire P, together with the band R outwardly into complete registry with the cavity 110 of the mold section 111. In this condition the usual vulcanizing may be commenced and continued for the required period of time.

It is manifest in this modified form of the invention, that a curing of the internal wall could be effectuated if desired, by merely initially supplying a vulcanizing medium in the conduit 118 prior to the entrance of the pressurized fluid as has been previously discussed. This alternate procedure could also be employed to reduce the overall period required for the complete vulcanization of the recapped tire.

Accordingly, other modifications of the invention may be resorted to without departing from the spirit thereof, or the scope of the appended claims.

What is claimed is:

1. A vulcanizing press of the character described, comprising; a pair of complemental relatively movable mold sections having opposed bead seats and defining when closed an annular chamber including a crown portion; a bead ring positioned between said bead seats and dividing said chamber into concentric sub-chambers; a former carried by one said mold section and being radially expandable into and out of engagement with said bead ring when said press is closed and being radially spaced from the crown portion of said chamber when in contact with said ring.

2. A vulcanizing press of the character described, comprising; a pair of complemental relatively movable mold sections having opposed bead seats and defining when closed an annular chamber including a crown portion; a bead ring positioned between said bead seats and dividing said chamber into concentric sub-chambers; a former carried by one said mold section and being radially expandable into and out of engagement with said bead ring when said press is closed and being radially spaced from the crown portion of said chamber when in contact with said ring; and means for passing fluid radially through said bead ring when said former is out of contact therewith.

3. A vulcanizing press of the character described, comprising; a pair of complemental relatively movable mold sections having opposed bead seats and defining when closed an annular chamber including a crown portion; a bead ring positioned between said bead seats and dividing said chamber into concentric sub-chambers; a former carried by one said mold section and being radially expandable into and out of engagement with said bead ring when said press is closed and being radially spaced from the crown portion of said chamber when in contact with said ring; and the means for introducing vulcanizing medium interiorly of said former when the same is in contact with said bead ring.

4. The device of claim 3 further characterized by the fact that said former includes means for transmitting said vulcanizing medium received interiorly thereof to a point adjacent said crown area of said closed mold section.

5. A vulcanizing press of the character described, comprising; a pair of complemental relatively movable mold sections having opposed bead seats and defining when closed an annular chamber including a crown portion; a bead ring positioned between said bead seats and dividing said chamber into concentric sub-chambers; a former carried by one said mold section and being radially expandable into and out of engagement with said bead ring when said press is closed and being radially spaced from the crown portion of said chamber when in contact with said ring; means for passing fluid radially through said bead ring when said former is out of contact therewith; and means for introducing vulcanizing medium interiorly of said former when the same is in contact with said bead ring.

6. A vulcanizing press of the character described, comprising; a pair of relatively movable mold sections defining when closed a tire curing chamber having opposed bead seats and a design-imparting tread portion; an expandable pneumatic former carried by one said mold section and being movable into and out of a position between said opposed bead seats when said press is closed; and an endless ring of fixed diameter positioned between said opposed bead seats and encircling said former when the same is expanded between said bead seats, whereby said former is radially spaced from said tread portion while in its condition of maximum expansion.

7. A vulcanizing press of the character described, comprising; a pair of relatively movable mold sections defining when closed a tire curing chamber having opposed bead seats and a design-imparting tread portion; an expandable pneumatic former carried by one said mold section and being movable into and out of a position between said opposed bead seats when said press is closed; and an endless ring of fixed diameter positioned between said opposed bead seats and encircling said former when the same is expanded between said bead seats, whereby said former is radially spaced from said tread portion while in its condition of maximum expansion; and means for introducing vulcanizing medium into the chamber defining said tread portion when said former is out of position between said bead seats.

8. A vulcanizing press of the character described, comprising; a pair of relatively movable mold sections defining when closed a tire curing chamber having opposed bead seats and a design-imparting tread portion; an expandable pneumatic former carried by one said mold section and being movable into and out of a position between said opposed bead seats when said press is closed; and endless ring of fixed diameter positioned between said opposed bead seats and encircling said former when the same is expanded between said bead seats, whereby said former is radially spaced from said tread portion while in its condition of maximum expansion; and means for supplying vulcanizing medium interiorly of said former when the same is in position between said bead seats.

9. The device of claim 8 further characterized by the fact that said former includes means for transmitting vulcanizing medium received interiorly thereof to said tire curing chamber.

10. A vulcanizing press of the character described, comprising; a pair of relatively movable mold sections defining when closed a tire curing chamber having opposed bead seats and a design-imparting tread portion; an expandable pneumatic former carried by one said mold section and being movable into and out of a position between said opposed bead seats when said press is closed; and endless ring of fixed diameter positioned between said opposed bead seats and encircling said former when the same is expanded between said bead seats, whereby said former is radially spaced from said tread portion while in its condition of maximum expansion; means for introducing vulcanizing medium into the chamber defining said tread portion when said former is out of position between said bead seats; and means for supplying vulcanizing medium interiorly of said former when the same is in position between said bead seats.

11. A vulcanizing press of the character described, comprising; a pair of relatively movable mold sections defining when closed a tire curing chamber having opposed bead seats and a design-imparting tread portion; an expandable pneumatic former carried by one said mold section and being movable into and out of a position between said opposed bead seats when said press is closed; means for limiting radial expansion of said former when the same is positioned between said bead seats, whereby said former is radially spaced from said tread portion while in its condition of maximum expansion; and said means including a bead ring received between opposed bead seats.

12. A vulcanizing press of the character described, comprising; a pair of relatively movable mold sections defining when closed a tire curing chamber having opposed bead seats and a design-imparting tread portion; an expandable pneumatic former carried by one said mold section and being movable into and out of a position between said opposed bead seats when said press is closed; means for limiting radial expansion of said former when the same is positioned between said bead seats, whereby said former is radially spaced from said tread portion while in its condition of maximum expansion; said means including a bead ring received between opposed bead seats; and said bead ring being apertured.

13. A vulcanizing press of the character described, comprising; a pair of relatively movable mold sections defining when closed a tire curing chamber having opposed bead seats and a design-imparting tread portion; an expandable pneumatic former carried by one said mold section and being movable into and out of a position between said opposed bead seats when said press is closed; means for limiting radial expansion of said former when the same is positioned between said bead seats, whereby said former is radially spaced from said tread portion while in its condition of maximum expansion; said means including a bead ring received between opposed bead seats; and said bead ring being channel-shaped in cross-sectional configuration.

14. A vulcanizing press of the character described, comprising; a pair of relatively movable mold sections defining when closed a tire curing chamber having opposed bead seats and a design-imparting tread portion; an expandable pneumatic former carried by one said mold section and being movable into and out of a position between said opposed bead seats when said press is closed; means for limiting radial expansion of said former when the same is positioned between said bead seats, whereby said former is radially spaced from said tread portion while in its condition of maximum expansion; said means including a bead ring received between opposed bead seats; and said bead ring being channel-shaped in cross-sectional configuration with the opposed edge portions thereof extending radially inwardly of said ring.

15. The device of claim 14 further characterized by the fact that said inwardly extending opposed edge portions are defined by a series of contiguous tab members.

16. A vulcanizing press of the character described, comprising; a pair of complemental relatively movable mold sections having opposed bead seats and defining when closed an annular chamber including a crown portion; a bead ring positioned between said bead seats and dividing said chamber into concentric sub-chambers; a former carried by one said mold section and being radially expandable into and out of engagement with said bead ring when said press is closed and being radially spaced from the crown portion of said chamber when in contact with said ring; and an ejector ring defined by one said bead seat and being movable relatively of one said mold section upon opening of said press.

References Cited in the file of this patent

UNITED STATES PATENTS

| | | |
|---|---|---|
| 1,375,542 | Traum | Apr. 19, 1921 |
| 1,734,766 | Fetter | Nov. 5, 1929 |
| 1,757,376 | Laursen | May 6, 1930 |
| 1,942,797 | Bittaker | Jan. 9, 1934 |
| 1,989,363 | Iverson | Jan. 29, 1935 |
| 2,354,446 | Brown | July 25, 1944 |
| 2,445,701 | Vogt | July 20, 1948 |
| 2,571,258 | Kolins | Oct. 16, 1951 |
| 2,597,550 | Tritt | May 20, 1952 |
| 2,699,572 | Soderquist | Jan. 18, 1955 |